United States Patent [19]

Moore, Sr.

[11] Patent Number: 4,847,464
[45] Date of Patent: Jul. 11, 1989

[54] TOOL FOR FORMING A SPINNERET CAPILLARY

[75] Inventor: Samuel E. Moore, Sr., Claymont, Del.

[73] Assignee: E. I. Du Pont de Nemours and Company, Wilmington, Del.

[21] Appl. No.: 899,872

[22] Filed: Aug. 25, 1986

[51] Int. Cl.[4] .......................... B23H 1/04; B23H 9/00
[52] U.S. Cl. ................................................. 219/69.15
[58] Field of Search ........................ 219/69 E; 204/280;
173/93.7; 82/1 C; 407/66, 115, 118, 120, 53, 54;
408/203.5, 204, 205, 206; 51/204, 212; 125/37

[56] References Cited

U.S. PATENT DOCUMENTS

| 730,362 | 6/1903 | Geisenhöner | 407/115 |
|---|---|---|---|
| 1,192,110 | 7/1916 | Pilkington | 407/118 |
| 1,781,863 | 11/1930 | Shoemaker | 408/205 |
| 2,627,107 | 2/1953 | Malco | 407/66 |
| 2,718,689 | 9/1955 | Mason et al. | 407/54 |
| 2,848,804 | 8/1958 | Graves et al. | 407/120 |
| 2,905,059 | 9/1959 | Fabish | 407/54 |
| 2,920,180 | 1/1960 | Ullmann et al. | 219/69 E |
| 3,271,128 | 9/1966 | Brown et al. | 219/69 E |
| 3,322,185 | 5/1967 | Christenson | 219/69 E |
| 3,622,735 | 11/1971 | Mainwaring | 219/69 E |
| 4,076,441 | 2/1978 | Byrnes | 407/115 |
| 4,349,716 | 9/1982 | DiPiazza | 219/69 E |
| 4,497,101 | 2/1985 | Schrader | 219/69 E |
| 4,654,499 | 3/1987 | Houman et al. | 219/69 E |
| 4,660,807 | 4/1987 | Campana | 219/69 E |

FOREIGN PATENT DOCUMENTS

| 891245 | 7/1949 | Fed. Rep. of Germany | 407/120 |
|---|---|---|---|
| 1007297 | 2/1952 | France | 173/93.7 |
| 184634 | 11/1982 | Japan | 219/69 E |
| 1347391 | 2/1974 | United Kingdom | 219/69 E |

*Primary Examiner*—A. D. Pellinen
*Assistant Examiner*—Geoffrey S. Evans

[57] ABSTRACT

An electrode for use with electric discharge machining in forming a complex spinneret orifice having concentric annular passages is made of a plurality of concentric male segments formed to correspond to the configuration of the passages.

2 Claims, 3 Drawing Sheets

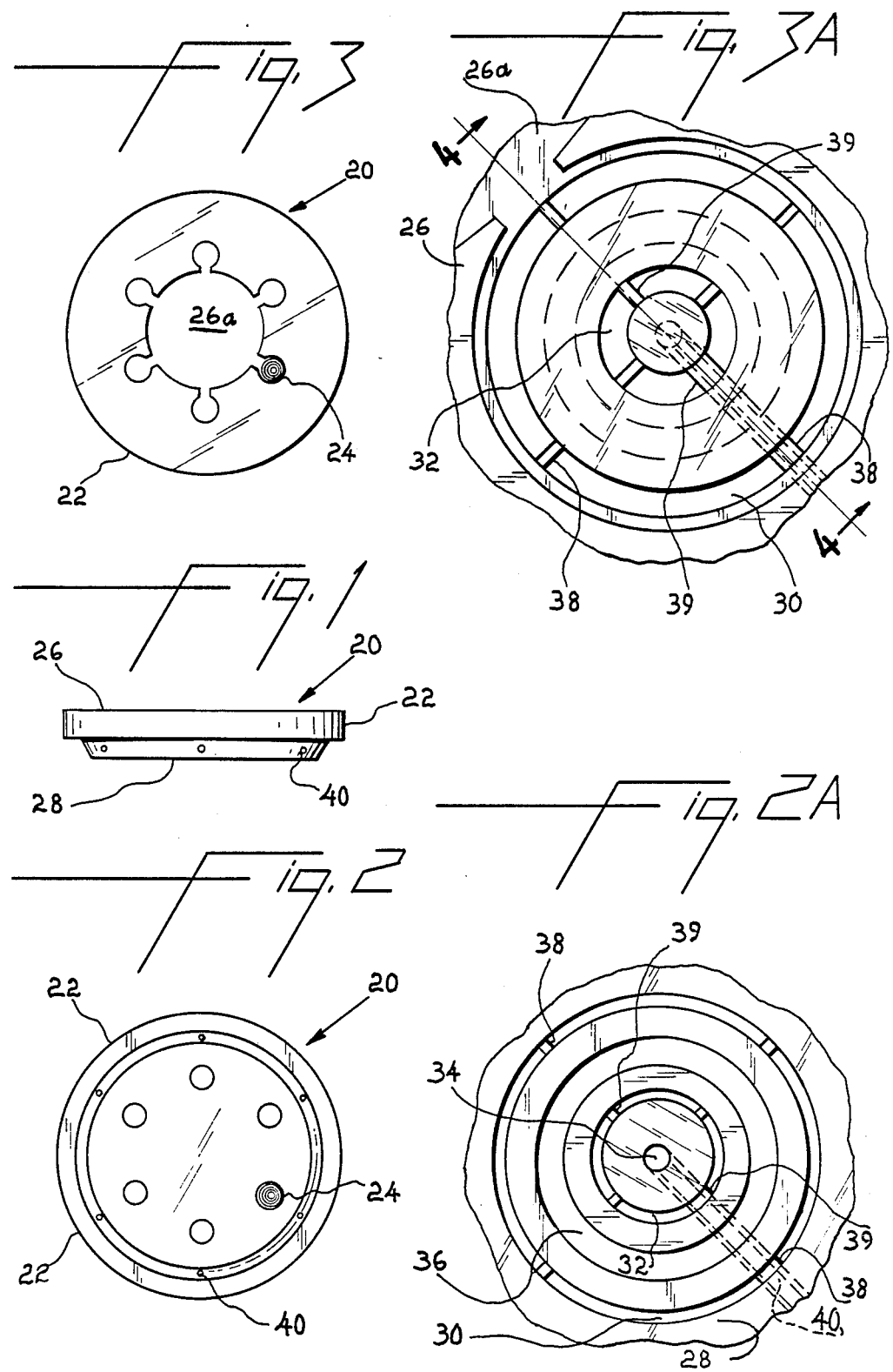

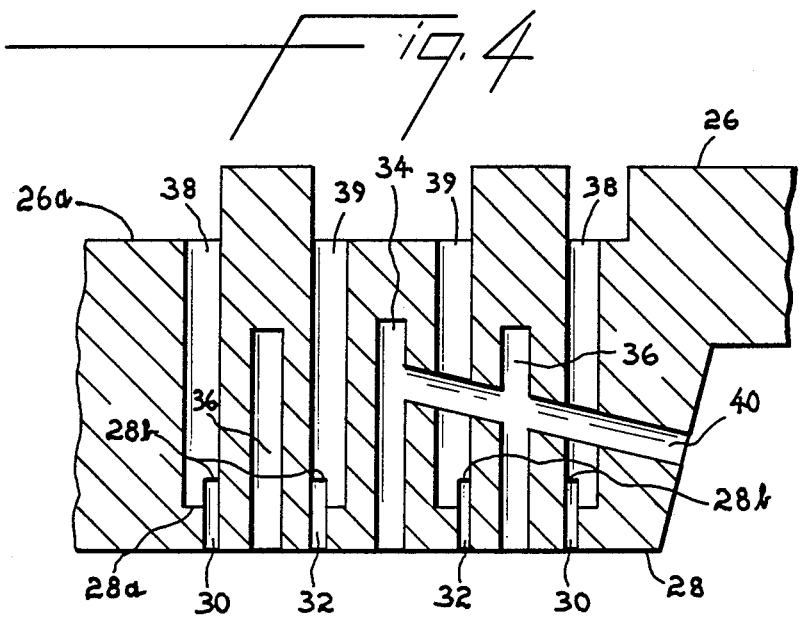
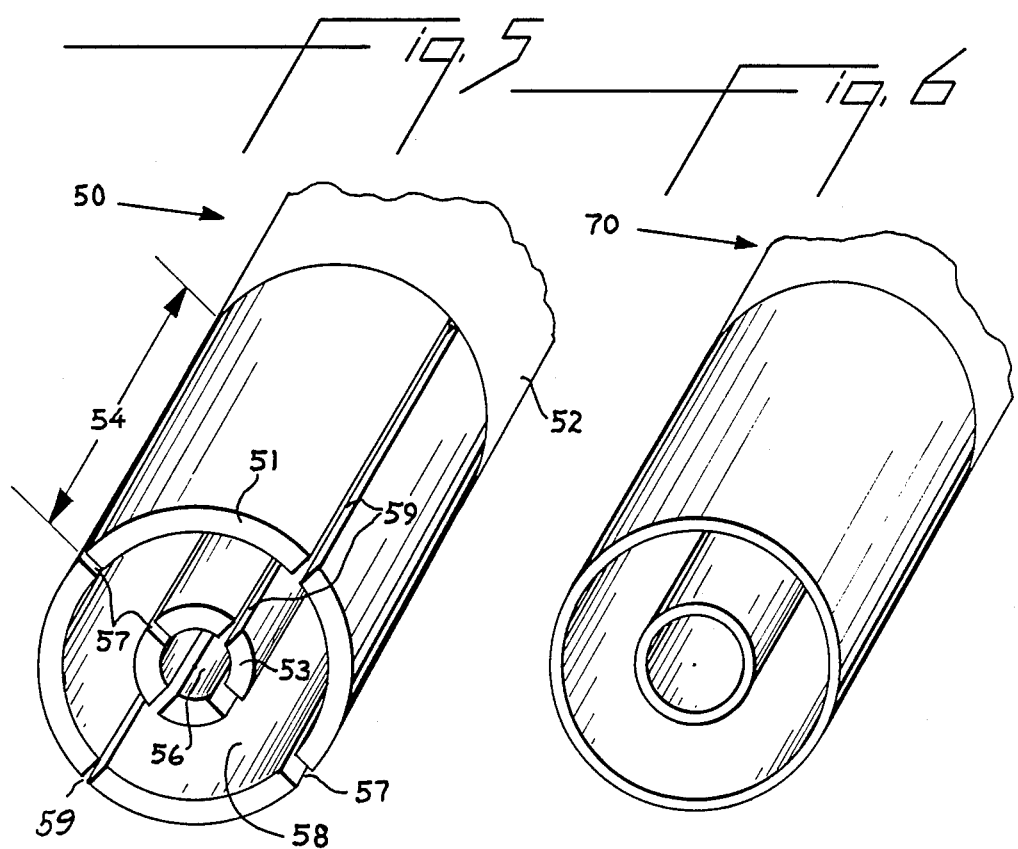

TOOL FOR FORMING A SPINNERET CAPILLARY

BACKGROUND OF THE INVENTION

This invention relates generally to spinnerets used to produce hollow filaments cospun with a core within the hollow portion of the hollow filament and more particularly to fabrication of spinneret capillaries used to form such filaments.

Spinneret capillaries used to form hollow filaments require complex orifices on the face of the spinneret, particularly when a hollow filament core is co-spun within another hollow filament. In one case of hollow within hollow co-spun filaments, the outer shape of each co-spun filament is formed by segments of a round configuration. These are segmented to provide points where air can enter the formed hollow portion to prevent collapsing of the filaments and to provide support to the internal sections forming the complex orifice. In another case, polymer feed cavities to the orifice are segmented to provide support as well as a point where fluid such as air can enter to support a hollow.

To obtain good filaments, it is absolutely essential that the complete orifice for each capillary be made precisely and that all orifices in a spinneret be made identical. One approach uses shaped inserts in a single hole. Another approach uses punches which are indexed into several positions. Both of these methods are tedious and time consuming and often result in orifices which lack the dimensional precision required for spinning uniform filaments. Machining a male punch is very difficult in the small complex sizes involved and still obtain precise shapes.

SUMMARY OF THE INVENTION

The invention involves the use of electric discharge machining to form spinnerets with capillaries to produce such complex-shaped filaments as a hollow within a hollow filament. The electric discharge machine is fitted with an electrode to form the capillaries. The electrode is preferably made from graphite; however, it could also e formed from other materials such as a copper-tungston alloy. The electrode has a plurality of concentric longitudinally extending male segments in an end which correspond to the configuration of the passages through the spinneret. The electrode is formed by means comprising a cutting tool formed of a rod having a longitudinal curved wall extending from one end of the rod. The wall terminates at an angle of about 15 degrees with respect to a plane perpendicular to the longitudinal axis of the rod.

BRIEF DESCRIPTION OF THE DRAWINGS

FIGS. 1-3 are side elevation, lower surface and upper surface views, respectively, of a spinneret made by this invention.

FIGS. 2A and 3A are enlarged views of a spinneret capillary viewed from the lower and upper surfaces, respectively, of the spinneret of FIG. 1.

FIG. 4 is an enlarged cross-sectional view of the capillary of FIG. 3A taken along line 4—4.

FIGS. 5 and 6 are perspective views of the graphite electrodes used to electrically discharge machine the annular passages of the spinneret capillaries shown in FIGS. 3A and 2A, respectively.

DETAILED DESCRIPTION OF THE ILLUSTRATED EMBODIMENTS

Figure 7:
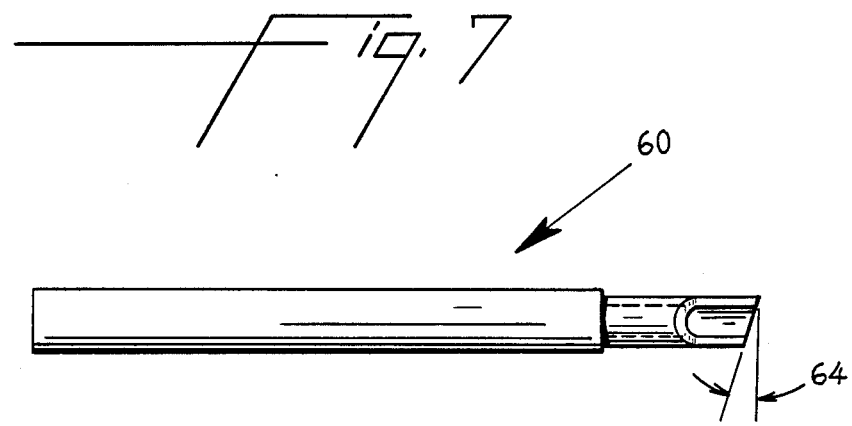
FIGS. 7 and 8 are top and side views of a cutting tool used to machine the graphite electrodes shown in FIGS. 5 and 6.

Referring now to FIGS. 1-4, spinneret 20 is adapted to be mounted in a filter pack for supplying one or more polymer compositions to be spun into a filament. The spinneret 20 is formed from a plate 22 and is provided with a capillary 24, connecting its upper and lower surfaces 26, 28, respectively. The capillary is formed of two concentric annular passages 30, 32, a central cavity 34 located concentrically within annular passage 32 and a second cavity 36 located between the annular passages 30, 32. There are a plurality of supports 38, 39 bridging annular passages 30, 32, respectively, at angular locations around the annular passages to provide structural integrity to the spinneret. These supports 38, 39 extend partially through the annular passages and are radially aligned at the angular locations. A bore 40 leads from the lower surface 28 of the spinneret through two aligned supports 38, 39 to cavities 34, 36 for the purpose of venting the cavities.

In operation, a molten polymer composition moves initially into recess 26a of the upper surface 26 of the spinneret, then it is uniformly distributed through annular passage 30 to form a hollow filament. At the same time, another polymer composition is fed to annular passage 32 to form a hollow filament within the hollow filament formed from passage 30. As polymer flows out from the exit end of the capillary, a partial vacuum is formed causing a gravity flow of room air through bore 40 to cavities 34, 36 and into the inner and outer hollow filaments.

The process used to form the capillaries 24 in the spinneret is known as electrical discharge machining which is a process that utilizes electrical discharges to machine metal. The surface being machined is bombarded with high intensity electrical energy pulses that gradually melt away the stock until the desired configuration is obtained. A machine useful for machining spinnerets is a model SM 1500E by Hansvedt.

Figure 8:
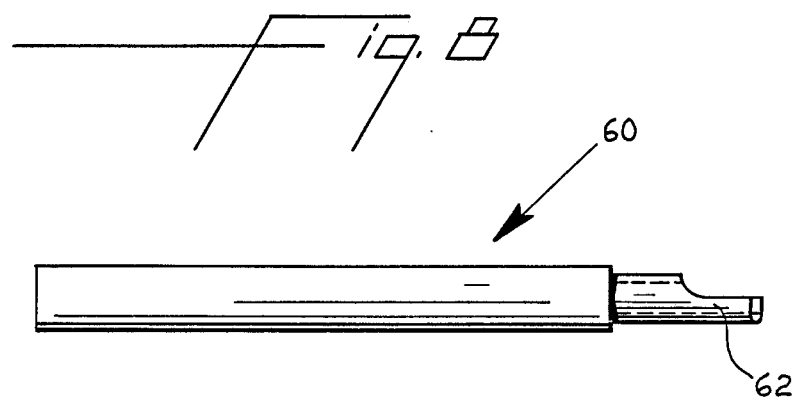

The male electrodes used to machine the capillary 24 are shown in FIGS. 5 and 6. The electrode 50 shown in FIG. 5 is used to machine the capillary from 26a to a location 28a (FIG. 4) within the plate to the base of the supports 38 and 39. Electrode 70 shown in FIG. 6 is used to machine annular passages 30, 32 from lower surface 28 to location 28b with the plate. The electrodes 50 and 70 are made in substantially the same way, preferably from graphite rod material, and a description of a method for making electrode 50 is as follows: a graphite rod 52 is turned in a lathe to a diameter to the dimension required for the outside diameter of annular passage 30 then a central bore 56 is machined followed by the machining of an annular space 58 concentric with bore 56. Both bore 56 and space 58 terminate at a length 54 shown on rod 52 which is greater than the thickness of spinneret plate 22. Slot 57 and 59 are then milled into the rod 52 to a distance from the end of the rod shown as length 54. This leaves concentric longitudinally extending male arc-shaped segments 51 and 53 formed in one end of rod 52. These segments correspond to the configuration of annular passages 30, 32. Frequently, the width of the annular passages is between 0.002" and 0.005", therefore machining the annular space 58 in the graphite rod 52 requires a special cutting tool such as that shown in FIGS. 7 and 8. The tool generally designated 60 has a longitudinal semicircular wall 62 extending from one end. The wall terminates at an angle 64 (about 15°) with respect to a plane perpendicular to the longitudinal axis of the tool. Due to the typically narrow annular passage widths to be cut, the semicircular shape of the cutting end of the tool provides the degree of stiffness needed to machine the annular space 58 with the precision required.

I claim:

1. A graphite electrode for use with an electric discharge machine for forming a spinneret orifice having a plurality of concentric annular passages comprising: an elongated rod having a plurality of male segments longitudinally extending from one end thereof, said male segments being arranged in a plurality of concentric segmented annuli, said male segments being formed to correspond to the configuration of said plurality of concentric annular passages.

2. The electrode of claim 1, there being two of said segmented annuli.

* * * * *